No. 857,330. PATENTED JUNE 18, 1907.
F. J. CONANT.
VEHICLE WHEEL.
APPLICATION FILED JUNE 26, 1906.
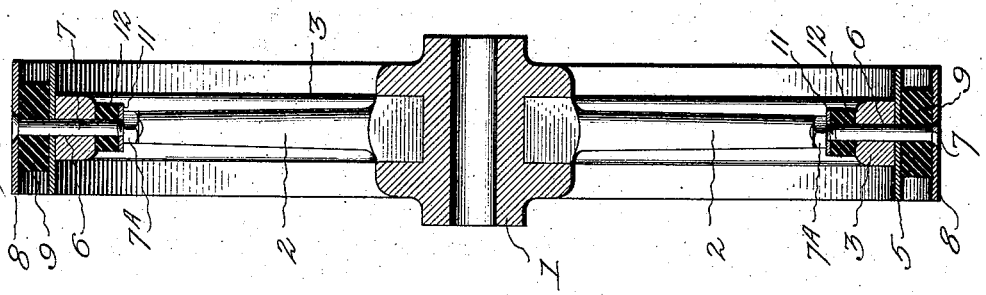
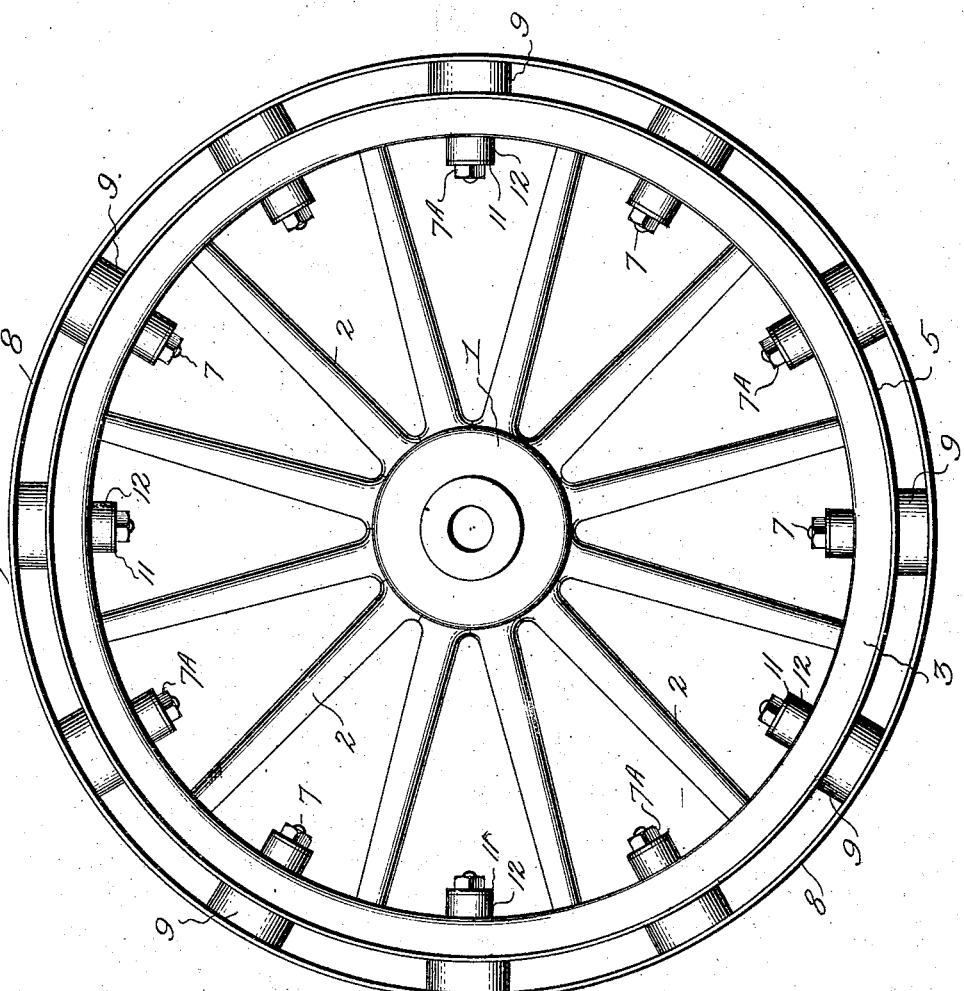
Witnesses: Inventor:
G. Sargent Elliott By Francis J. Conant,
Adella M. Fowle H. L. Bailey, Attorney.

ed, and although it is very firmly secured by the bolts yet it is not rigidly secured, inasmuch as the bolts have a slight elastic support and consequently the outer tire which is firmly yet not rigidly secured to the felly, operates under the tension of the elastic cushioning to regain its original position and finally prevents any considerable wear or strain between the outer tire and the felly.

UNITED STATES PATENT OFFICE.

FRANCIS J. CONANT, OF LOS ANGELES, CALIFORNIA.

VEHICLE-WHEEL.

No. 857,330.  Specification of Letters Patent.  Patented June 18, 1907.

Application filed June 26, 1906. Serial No. 323,522.

*To all whom it may concern:*

Be it known that I, FRANCIS J. CONANT, a citizen of the United States of America, residing at Los Angeles, county of Los Angeles, and State of California, have invented a new and useful Vehicle-Wheel, of which the following is a specification.

My invention relates to improvements in elastic cushioning tire wheels for automobiles and other vehicles; and the objects of my invention are: first, to provide an elastic tire cushioning automobile wheel; second, to provide a double tire elastic wheel constructed so that should the outer tire break while running on a road, the rider can return home on the inner tire; and, third, to provide a wide tread elastic cushioning double tire, that is strong and durable, and that can be manufactured cheaply. I attain these objects by the mechanism illustrated in the accompanying drawings, in which:

Figure 1, is a front elevation of a vehicle wheel constructed in accordance with my invention; and Fig. 2, is a vertical sectional view through the same.

Similar letters of reference refer to similar parts throughout the several views.

Referring to the drawings, the numeral 1, designates the hub of my improved wheel. To this hub I attach in any of the different ways that are in common use, a circumferential row of spokes 2, the outer ends of which are secured in a felly 3, which may be made of any suitable material, and is substantially rectangular in cross-section, with a flat outer periphery. This felly may be made hollow or solid, as desired, and on it I secure a tire 5, which is made wider than the felly. This tire is preferably used but it may be dispensed with if the outer periphery of the felly be flanged out as wide as it is desired to make the wheel. Through the felly and its tire, and between each pair of spokes, I form a radial aperture 6, and in these apertures I place bolts 7, the threaded end and nut 7A of which project from the inside of the felly toward the hub. These bolts extend radially beyond the felly to an outer tire 8, which is the tread tire. This tread tire is a thin flat metal tire, and it is made enough larger than the felly to permit an elastic medium 9, to be placed between it and the felly tire. This elastic medium may consist of a plurality of springs of any elastic material, or if desired of metal, but I preferably use for the elastic cushions a plurality of rubber cushions which I term tire cushions, each of which is provided with a central aperture that permits it to be placed loosely on one of the bolts 7, and between the outer tire and felly. These rubber cushions may be either square or round or of any other desired shape. The bolts extend through them, and through the outer tire, and the outside entrances of the apertures in the outer tire are countersunk to allow the heads of the bolts to sink into the tire level with the surface of the tire. The bolt preferably fits tightly in the outer tire and loosely and slidably in the felly and its tire, so that at the tread point of the tire when there is a load pressure on the tire and it compresses the cushions at the tread point, it consequently moves a trifle nearer to the felly-tire at that point. The felly should be deep enough to form a long bearing for the bolts, which should fit closely enough to move radially slightly but should not permit the outer tire to move sidewise or laterally on the felly and its tire, and the bolts nearest to the tread point as the wheel revolves will be slightly pushed through the felly. I make the bolts long enough, however, to receive a metal washer 11, below the nut, and a rubber cushion or washer 12 which I term the felly cushion between the metal washer and the felly, which is compressed to such an extent when the nut of the bolt is tightened that as the tread pressure pushes the bolt through the felly the rubber washer gives enough to always bear against the metal washer, which in turn bears against the nut.

The operation is as follows: The outer tire is very firmly secured to the felly by the bolts, and as they are tightly screwed up against the felly the elastic cushioning springs 9, will be very firmly compressed between the felly and tire, and they are placed under sufficient tension to meet the practical requirements of the size and weight and character of the wheel and automobile to which the wheel is to be applied. The amount of cushioning movement is so slight as not to be noticeable in the movement of the bolts, and any compression at the tread point causes a tension at the top or opposite side of the wheel; consequently the compressive cushioning and resilient tension due to pressure at the tread of the wheel is transmitted throughout the circumference of and is absorbed throughout the circumference of the wheel. In case the outer tire of the wheel gets twisted or bent or broken through an accident, the outer tire and the rubber springs 9 and the bolts, can be removed entirely from the felly, and the rider can still run the automobile on the felly of the wheel to a place where he can ave the wheel repaired.

My invention is simple and durable, and will make a practical cushioning automobile wheel.

Having described my invention, what I claim as new and desire to secure by Letters Patent, is:

1. In a wheel, the combination with a hub and a felly, a rim wider than the felly, a tire concentric with and of larger diameter than said rim, a plurality of spokes radiating from said hub to said felly, a series of rubber cushions between the rim and the tire, a second series of rubber cushions within the felly between the said spokes, each cushion of the second series being in radial alinement with a cushion of the first series, and a series of clamping bolts extending through the felly, rim and tire, each bolt passing through a pair of cushions, a clamping nut on the inner end of each bolt, and a washer between said nut and the inner cushion.

2. In a wheel, the combination of a felly, a rim wider than the felly, a tire concentric with and of larger diameter than said rim, a series of rubber cushions between the rim and the tire, a second series of rubber cushions within the felly, each cushion of the second series being in radial alinement with a cushion of the first series, and a series of clamping bolts extending through the felly, rim and tire, each bolt passing through a pair of cushions, a clamping nut on the inner end of each bolt, and a washer between said nut and the inner cushion.

3. In a wheel, the combination with the felly, the spokes, and the hub, of a rim mounted on said felly of greater width than said felly, a tire concentric with and of larger diameter than said rim, a series of rubber cushions between the rim and the tire, a series of clamping bolts extending from said tire through said rim and felly and beyond said felly between said spokes, a nut threaded to the end of each of said clamping bolts, a washer on each clamping bolt adjacent to said nut, and a rubber cushion on each clamping bolt between said washer and said felly in radial alinement with the rubber cushions between said rim and tire.

In testimony whereof I affix my signature in presence of two witnesses.

FRANCIS J. CONANT.

Witnesses:
JNO. F. MENDENHALL,
RALPH BARNEY.